Feb. 11, 1958 E. T. CARRIER 2,823,298
ELECTRODE HOLDER
Filed Nov. 28, 1955 2 Sheets-Sheet 1
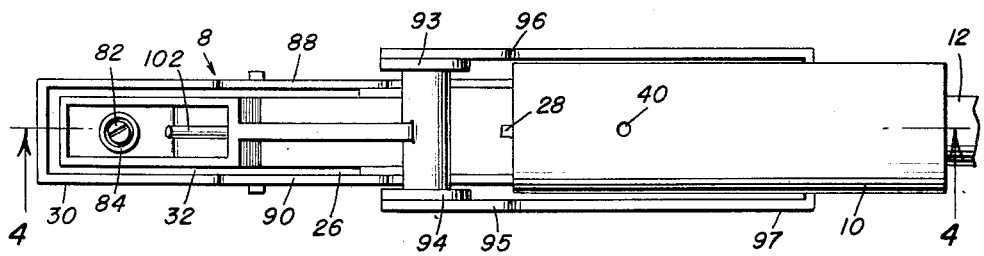
Edmund T. Carrier
INVENTOR.

Feb. 11, 1958　　E. T. CARRIER　　2,823,298
ELECTRODE HOLDER
Filed Nov. 28, 1955　　2 Sheets-Sheet 2
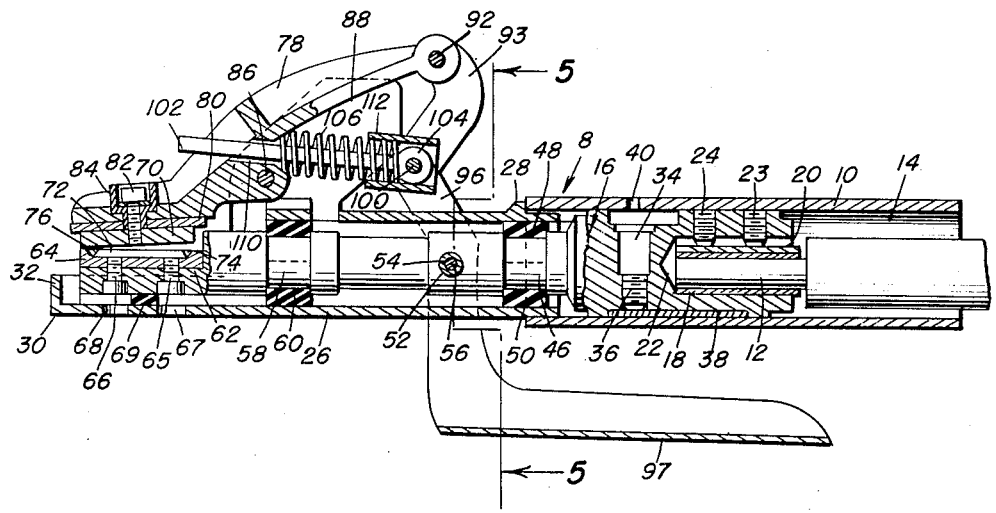
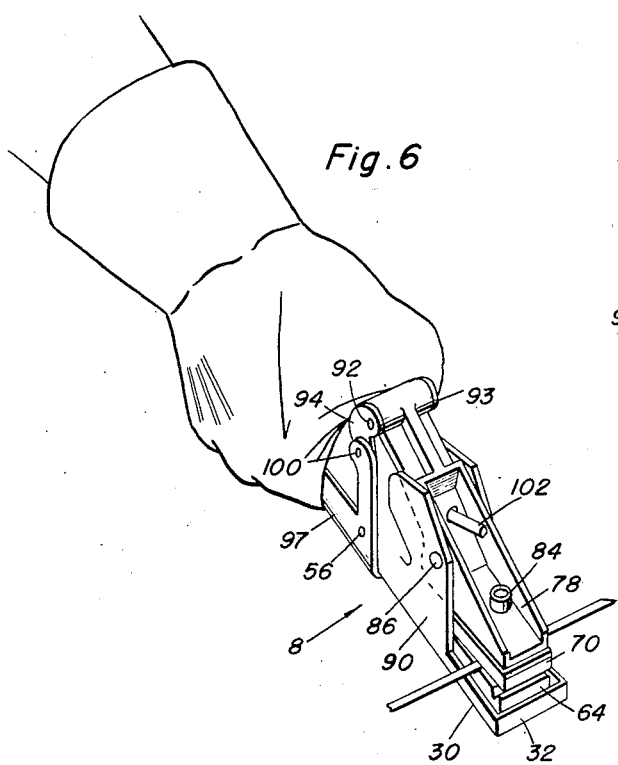
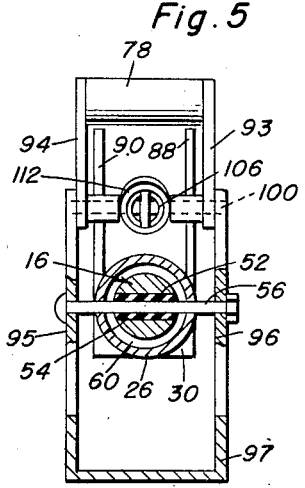
Edmund T. Carrier
INVENTOR.

2,823,298
Patented Feb. 11, 1958

2,823,298

ELECTRODE HOLDER

Edmund T. Carrier, Highland Park, Mich.

Application November 28, 1955, Serial No. 549,246

6 Claims. (Cl. 219—138)

This invention relates to electrode holders and particularly to an electrode holder which is primarily useful in welding operations.

An object of the present invention is to provide a mechanically simple but very effective electrode holder for electric welding, the holder having a pair of jaws which are spring closed at all times so that the electrode is held without application of force directed to retain the electrode clamped, the electrode being easily released upon application of a minimum of force to an operating lever that is pivoted to a handle.

A further object of the invention is to provide an electrode holder which effectively releases the electrode at such time that it is desired to discard it, this releasing being taken place by depression of a lever which operates a link, the latter being connected to one end of a rocker that is normally spring-biased in such direction as to close the jaws of the holder. Accordingly, the action is that upon operating the lever the spring is depressed and at the same time the jaws are opened by the mechanical linkage so that upon release of the lever the spring returns the linkage, the lever and the rocker to the jaw closing position.

One of the most important features of the invention is the safety which it affords the welder. One of the jaws is completely electrically insulated while the other is conductive, but the conductive jaw has the electrical conductor connected to it in such a way that all parts which could come in contact with the welder are well insulated by placing insulating parts between the conductive parts at places where they are not fatigued even after continual use.

In production welding operations welding rods are frequently replaced. Accordingly, the welder must remove the small portion of the welding rod in his holder as a part of his duties. In this regard, the welding rod being held by spring action, by use of the present invention a mere depression of the lever completely frees the used welding rod so that it falls from the jaws at the desire of the operator. Therefore, it is a further object of the invention to provide a welding rod holder, the use of which permits the removal of the welding rod portion very easily.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the electrode holder;

Figure 2 is a side view of the electrode holder in Figure 1;

Figure 3 is a front view of the electrode holder in Figure 1;

Figure 4 is a longitudinal sectional view taken on a plane of line 4—4 of Figure 1 and in the direction of the arrows;

Figure 5 is a transverse sectional view taken on the plane of line 5—5 of Figure 4 and in the direction of the arrows; and, Figure 6 is a perspective view of the electrode holder showing the same in use.

The electrode holder 8 exemplifying an embodiment of the invention consists of a handle 10 of electrically insulating material, for example, hard rubber, wood or plastic. The heavily insulated wire 12 is passed into the bore 14 of the handle 10 and is fixed in the electrical conductor 16 that is located in the handle 10. The wire 12 is held in place by having a cap 18 of conductive material thereon, this cap being contacted by a saddle cable clamp 20, both of these parts being fitted in the bore 22 of the conductor 16. Set screws 23 and 24 carried in threaded passages in the conductor 16 bear against the outer surface of the cable clamp 20 pressing it tightly against the copper covering 18 in order to fix the wire 12 to the conductor 16 so that it is immovable with respect thereto and in order to establish good conductivity between the wire and the conductor 16.

A hollow body 26 that is made in the form of a sleeve, has a shoulder 28 adjacent to but spaced from the inner end thereof. The handle 10 is inserted on the sleeve 26 and pushed inwardly thereof until the edge of handle 10 comes to bear against shoulder 28. A horizontal lower extension 30 protrudes forwardly of the body 26 and has an upstanding peripheral flange 32.

Conductor 16 comprises an elongated rod of electrically conductive material that has bore 22 at one end thereof. A transverse bore 34 at least partially threaded, is formed in the conductor 16 and accommodates a set screw 36. This set screw comes to bear against a spring 38 that is attached in a lower recess formed in the conductor. A tightening tool, for example an Allen wrench, is passed through aperture 40 in the handle 10 in order to engage the peripheral oval shaped opening in the end of set screw 36. Upon rotation of the set screw 36 in this manner, the spring 38 is forced outwardly against the inner surface of handle 10, this action holding the conductor tightly fastened to handle 10.

A peripheral groove 46 is formed in the conductor 16 in advance of the bore 34 and it accommodates a locking seal, the latter being made of one or two pieces as at 48 and 50 and fitted in the groove 46. The locking seals 48 and 50 are sufficiently thick that when placed in groove 46 and the conductor is inserted in the body 26, they not only electrically insulate the conductor 16 from the body 26 but they also serve a locking function, holding the conductor fastened in place. A transverse bore 52 is drilled or otherwise formed in the conductor 16 in advance of groove 46. Bore 52 has an insulating sleeve 54 in it, this sleeve being oversized in order to accommodate a pivot pin 56, the latter extending completely through body 26 for a purpose to be described subsequently. In advance of the bore 52 there is a groove 53 that accommodates the locking seal 60, the latter being so dimensioned that it functions not only as an insulator for the conductor 16 but also to frictionally hold the conductor fastened in the body 26. Advancing further forward on the conductor 16 there is a flat or horizontal platform 62 to which jaw 64 is secured, as by bolts 65 and 66, access to which may be had through apertures 67 and 68 in the forward extension 30 of the body 26. A heat and electrical insulator 69 is located between the forward end of conductor 16 below jaw 64 and the upper surface of extension 30, being frictionally held in place. In view of the construction of conductor 16, the jaw 64 is energized from wire 12 but the surrounding structures are insulated therefrom.

The jaw 64 is one of a pair, the upper jaw 70 having a flat or serrated surface, while the second jaw 64 is of special construction. It includes a well 72 in the upper surface, this well having two transverse grooves 74 and 76 that form seats for the welding rods.

Jaw 70 is held at the forward end of a rocker 78, the latter having an insulating pad 80 against which the jaw 70 bears. A screw 82, passing through an insulating cup 84 that is located in an aperture in the forward end of rocker 78, holds the jaw 70 fixed in place on the insulating pad 80. Accordingly, the jaw 70 is completely insulated from all other parts of the electrode holder except the jaw 64 or a welding rod maintained therein.

Rocker 78 is pivoted on a pin 86 intermediate the front and rear ends thereof. This pin is carried by aligned bearings, as apertures, in the upstanding brackets 88 and 90 that rise from the edges of body 26 and a portion of the forwardly projecting extension 30. The back end of rocker 78 has a pivot pin 92 passed through an aperture in it, this pivot pin accommodating links 93 and 94 which are pivoted to the ends thereof. The lower ends of these links 93 and 94 are pivoted to the legs 95 and 96 of lever 97, the latter being bifurcated at one end, the furcations or legs 96 and 95 straddling body 26 and having the pivot pin 56 passed through aligned openings therein. The hand actuating portion of the lever 97 is approximately parallel to the handle 10 so that it is easily gripped by the hand of the user as shown in Figure 6.

Yielding means constantly retaining the jaws in the closed position are attached to the rocker 78 and to the junction portion of links 93 and 94 with legs 95 and 96. This junction is made by a pivot pin 100 passing through aligned apertures in both links 93 and 94 and both furcations or legs 95 and 96. A guide rod 102 is fitted with a sleeve 104 at one end, this sleeve being mounted on pivot 100. This rod passes through a spring 106 that has one end bearing against a part of the rocker 78 at a place laterally spaced from the axis of the pivot 56. Accordingly, the bias of the spring is in such direction on the rocker 78 and applied in such place that the rocker tends to rotate about the pivot 86. The direction of rotation is such that the jaws 64 and 70 are brought together. Rod 102 is passed through an aperture 110 formed in the rocker 78. This constrains the travel of the rod 102. Spring 106 bears at one end against the rocker 78 as described previously and at the opposite end, it rests against the sleeve 104. A spring housing 112 is disposed on the spring 106 in order to retain the spring while it is being compressed and expanded during the operation of the lever 97.

In use of the electrode holder, the welder squeezes the lever 97 toward handle 10, this action causing the lever to be pivoted about the axis of pin 56. Such action pulls the links 94 and 93 downwardly thereby rocking the rocker 78 in such direction that the jaws 64 and 70 open. This applies a slight compressive force to the spring 106 while the guide rod 102 slides through aperture 110 in the rocker. The welding rod is then manually inserted between the jaws. Conversely, if there has been previously a welding rod inserted therein and used, the small portion of the welding rod that is to be discarded is simply emptied from between the jaws.

Assuming that a new welding rod is placed between the jaws, it is preferred that it be placed in one of the notches or grooves 74 or 76 in order to grip it firmly. Then upon releasing the lever 97, the spring 106 which normally retains the jaws closed, forces the rocker 78 pivotally about pin 86 in such direction as to bring the jaws together against the welding rod.

The electrical conductivity of the welding rod holder has been described. One jaw 64 is energized, while the other is completely insulated from all other conductive parts of the welding rod holder.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrode holder comprising a handle, a pair of jaws, a first of said jaws carried by said handle, an electrical conductor in said handle and connected with said first jaw, a lever pivoted to said handle, a rocker pivoted between its ends to said handle, the second of said jaws carried by one end of said rocker, a link pivoted to the opposite end of said rocker and to said lever, means including a spring reacting on said rocker in a direction tending to rotate said rocker about its pivot in a direction to move said jaws together in order to clamp the electrode therebetween, said rocker having an aperture, and a rod extending through said spring and said aperture and pivotally connected at one end at the junction of said link with said lever.

2. In a welding rod holder, a handle assembly, a conductor in said handle assembly, means clamping said conductor in said handle assembly and maintaining said conductor in insulated condition from said handle assembly, said clamping means including a mechanical clamp, a spring connected with said clamp to assist in holding said conductor fixed in said handle assembly, a pair of jaws, one of said jaws being attached to said conductor, the second of said jaws being located adjacent thereto, a rocker pivoted to said handle assembly, means securing said second of said jaws to one end of said rocker, an insulator retaining said second jaw insulated from said rocker, and means pivoted to said handle assembly for actuating said rocker in order to open said jaws.

3. The combination of claim 2 together with means for applying a force to said spring to hold it pressed against said handle assembly part.

4. In an electrode holder for electric welding, a handle assembly, a lever, means pivoting said lever to said handle assembly, means electrically insulating said lever, a conductor through which said pivot means passes and through which said insulating means passes, a rocker pivoted to said handle assembly, means drivingly connecting said lever to said rocker in order to impart rocking motion thereto, yielding means applying a force to said rocker tending to rotate said rocker in one direction, a pair of jaws, one of said jaws carried by said rocker, the other of said jaws carried by said conductor and juxtaposed with respect to the first mentioned jaw, and means insulating the jaw on said rocker therefrom.

5. An electrode holder for electric welding, said holder comprising a handle assembly, a conductor, means securing said conductor in said assembly, said assembly having an extension at one end, said conductor extending parallel to said extension, a jaw secured to said conductor in juxtaposition to said extension, a rocker, means mounting said rocker on said assembly for rocking movement, a second jaw carried by one end of said rocker and coacting with said first jaw in order to hold an electrode therebetween, means for opening said jaws and carried by said assembly, and means operatively connected with the last mentioned means and said rocker for normally holding said jaws in a closed position including a spring which reacts on said rocker, a guide operatively connected with said spring and said rocker, said rocker having an aperture, and said guide being passed through said aperture to constrain the motion of said guide.

6. An electrode holder for electric welding, said holder comprising a handle assembly, a conductor, means securing said conductor in said assembly, said assembly having an extension at one end, said conductor extending parallel to said extension, a jaw secured to said conductor in juxtaposition to said extension, a rocker, means mounting said rocker on said assembly for rocking movement, a second jaw carried by one end of said rocker and coacting with said first jaw in order to hold an electrode therebetween, means for opening said jaws and carried by said assembly, and means operatively connected with the last mentioned means and said rocker for normally holding said jaws in a closed position, a spring clip operatively connected to said conductor and engaging frictionally said handle assembly in order to assist in retaining said conductor in said handle assembly.

References Cited in the file of this patent

UNITED STATES PATENTS

| | | |
|---|---|---|
| 1,552,244 | Thomas | Sept. 1, 1925 |
| 1,851,039 | Fausek et al. | Mar. 29, 1932 |
| 1,943,754 | Buttaci et al. | Jan. 16, 1934 |
| 2,236,372 | Kotchi et al. | Mar. 25, 1941 |
| 2,375,656 | Jackson | May 8, 1945 |
| 2,432,639 | Webster | Dec. 16, 1947 |

FOREIGN PATENTS

| | | |
|---|---|---|
| 149,841 | Great Britain | Aug. 26, 1920 |